A. G. WATERHOUSE.
CHANGE SPEED GEARING.
APPLICATION FILED OCT. 10, 1911.
1,032,168.
Patented July 9, 1912.
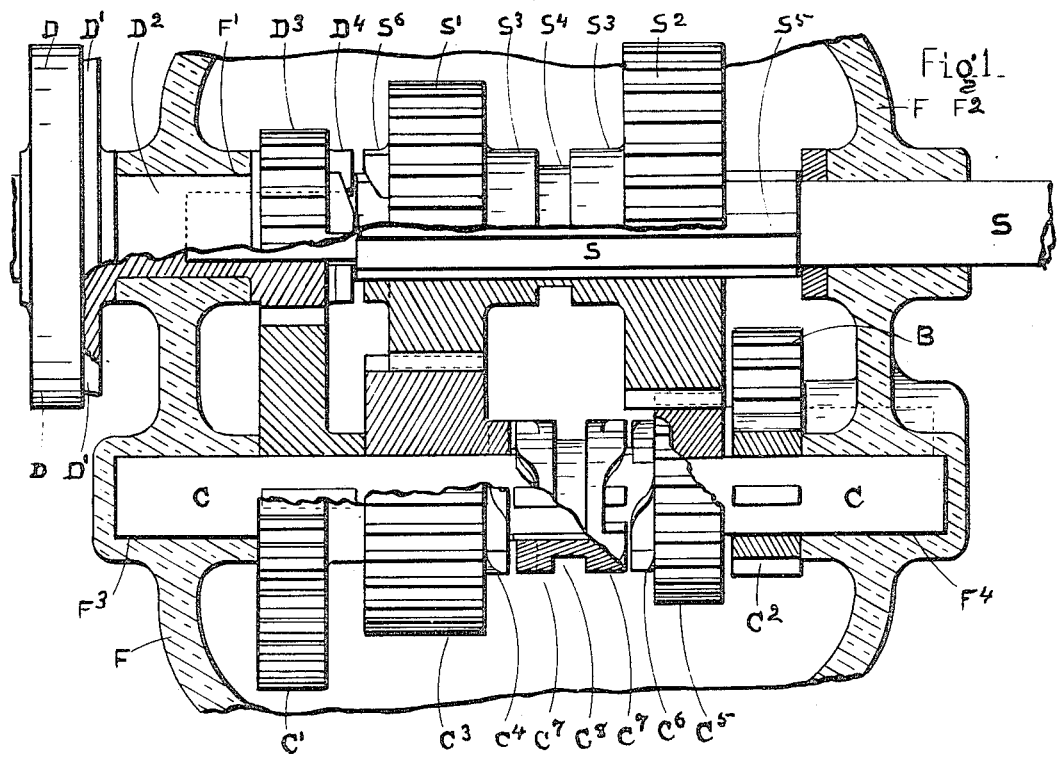
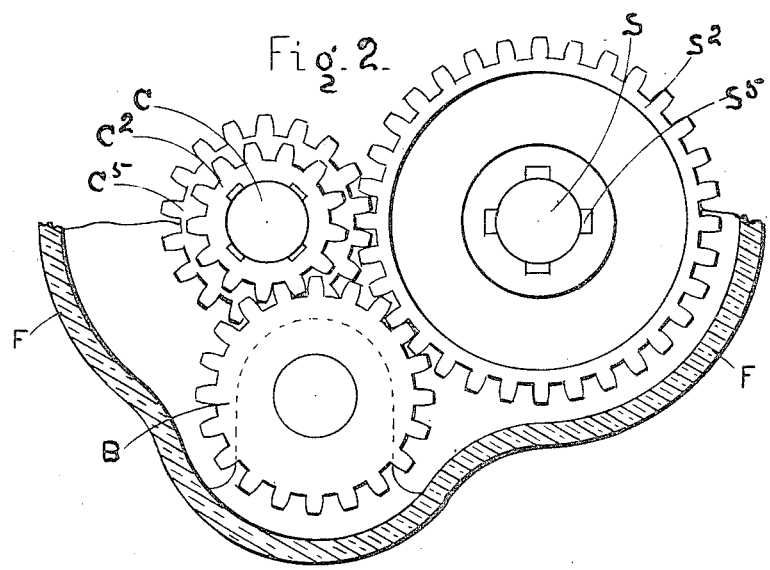
Witnesses:
William M. Cole
Thomas G. Dennis Jr.
Inventor
Addison G. Waterhouse

UNITED STATES PATENT OFFICE.

ADDISON G. WATERHOUSE, OF NEW YORK, N. Y.

CHANGE-SPEED GEARING.

1,032,168.

Specification of Letters Patent.

Patented July 9, 1912.

Application filed October 10, 1911. Serial No. 653,962.

*To all whom it may concern:*

Be it known that I, ADDISON G. WATERHOUSE, a citizen of the United States, residing at Eltingville, Staten Island, in the city of New York and State of New York, have invented new and useful Improvements in Change-Speed Gearing for Automobiles and other Purposes, of which the following is a specification.

My invention relates to variable speed transmission appliances suitable for transmission gearing for automobiles and other mechanical purposes, and the object of my invention is to permit the various gear wheels relating to both the driving and driven members of my transmission device, to remain in mesh while changes from one speed ratio to another are effected without the clashing of the gears, whereby when the means are employed for throwing one gear of the driven member or shaft into action, all the other gears corresponding to either speed will be thrown out of action, while at the same time automatic means are employed for throwing all or any of the gears out of action, without throwing them out of mesh when such gears are improperly thrown into action by accident or mismanagement in ways which would otherwise cause a smash of the gears or of the operating lever due to the sudden check in the speed of the car, or the relatively unequal speeds of the driving and driven members thrown into action.

Reference is had to the accompanying drawings forming part of this specification in which the various features of my invention will be more fully set forth and then pointed out in the claims, in which;

Figure 1, is a plan partly in section, showing a variable speed transmission device embodying my invention, and—Fig. 2, shows partly in section, an end view of part of Fig. 1.

Similar characters of reference indicate like parts in both views.

The letter D, indicates the driving part of a clutch driven by an internal combustion engine or other means; this part D, engages with a part D', forming the other part of the clutch and to which is connected a hollow bearing or sleeve $D^2$, and a toothed driving pinion $D^3$. The hollow bearing $D^2$, rests in the frame F, shown in section with part of it removed.

S, is a driven shaft having two bearings F', and $F^2$, one of which is an end bearing formed in the sleeve $D^2$, and pinion $D^3$, and the other bearing F, is at the extreme right of frame F, through which the shaft S, extends to any gear (not shown) but which may be used for propelling the driving mechanism of a car or for any other purpose. The shaft S, is free to rotate in its bearings F', and $F^2$, and has longitudinally upon its surface between such bearings splines $S^5$, or means for rotating wheels placed upon it while they are free to slide upon its surface lengthwise; the wheels as shown placed thereon, are indicated by S', and $S^2$, having different diameters, and joined by a sleeve $S^3$, provided with an annular groove $S^4$, into which a shifting fork (not shown) may be placed for sliding the wheels S', and $S^2$, along the shaft S.

C, is a countershaft held rotatably in bearings $F^3$, and $F^4$, on which is rigidly connected a toothed wheel C', which meshes into and is driven by the pinion $D^3$, forming part of the driving member; this countershaft has two wheels $C^3$, and $C^5$, adapted for coacting with the corresponding wheels S', and $S^2$, on shaft S; these wheels $C^3$, and $C^5$, are normally free to rotate on their shaft C, subject to the action of a clutch $C^7$, which engages them with or liberates them from their shaft as hereinafter described. The countershaft C, has also a toothed wheel $C^2$, rigidly fixed to it and made to mesh into and rotate a backing wheel B, secured in bearings formed in frame F, as shown in Fig. 2. This wheel B, is situated so that its pitch diameter will coincide with the pitch diameter of wheel $S^2$, on shaft S, so that wheel $S^2$, can be shifted to mesh into wheel B, causing the motion imparted from the counter shaft C to the driven shaft S, to be backward, or the reverse of that transmitted to it through the wheels $C^3$, or $C^5$, it being understood that while B, and $S^2$, are in mesh, wheels $C^3$, and $C^5$, must be free to rotate on their shaft C, and when C³, or C⁵, is used for transmitting motion, S², and B, must be out of mesh. Between the loose wheels C³, and C⁵, and placed on the shaft C, is a two faced sliding clutch C⁷, splined to its shaft to turn with it while freely sliding thereon; this clutch C⁷, is provided with an annular groove C⁸, into which a shifting fork (not shown) may be inserted to shift the clutch C, to the right, to cause its right clutch face to engage with a corresponding clutch face C⁶, made a part of wheel C⁵, or to the left to engage its left clutch face with a corresponding clutch face C⁴, made a part of wheel C³, or else be placed as shown in Fig. 1, so as to not be engaged with either. The clutch C⁷, and also the clutch faces of wheels C³, and C⁵, are all provided with ratcheted teeth, representing means for coacting in only one direction, and sliding by or repelling each other when acting in a relatively opposite direction. There is shown a direct driving clutch composed of two parts one of which is D⁴, on the face of pinion D³, and the other is S⁶, on or connected to the face of wheel S', and so arranged that when these parts are brought together the driving motion of pinion D³, will be transmitted directly to shaft S, and its wheels S', and S², and when they are separated; motion from D³, to shaft S, can be transmitted only through the wheels on the counter-shaft C. This transmitted motion will be in such a direction, and at such relative speeds as the shifting of the clutches will produce without taking any of the gears used for producing a forward motion to a car, out of mesh with each other.

The action of the mechanism shown is as follows: When motion is transmitted from the source of power through the driving clutch D, D', it will rotate the pinion D³, without rotating the shaft S, when the direct clutch D⁴, S⁶, is not engaged; but when the wheels S', and S², are shifted to the left, the clutch D⁴, S⁶, will be fully engaged before the wheels S', and S², are drawn out of mesh with their respective wheel C³, and C⁵, on the countershaft C; this would cause the shaft S, with its wheels, to be driven directly by, or through the clutch D⁴, S⁶, while the wheels S', and S², would rotate the wheels C³, and C⁵, on the countershaft C, idly; while at the same time the pinion D³, would rotate the wheel C', with its countershaft C, clutch C⁷, fixed wheel C², and backing wheel B, idly as long as the clutch C⁷, was not engaged with either of the wheels C³, or C⁵. Under the last stated conditions, with shaft S, under a direct drive from pinion D³ if through accident, mistake or mechanical defects, the clutch C⁷, were thrown in contact with either of the clutch faces of wheels C³, or C⁵, it would be instantly repelled, and prevented from engaging with such wheels or locking with them, so that no damage would be done or interference occur with the advance of the car while under such a direct drive: the reason for this is that owing to the difference in diameters between the pinion D³, and wheel C', the rotation of the countershaft C, with its clutch C⁷, would be slower than that of the shaft S, while subject to a direct drive, or while clutched to the pinion D³, which would cause the wheels S', and S², on shaft S, to rotate the loose wheels C³, and C⁵, on shaft C, faster than its clutch C⁷; thereby allowing their free rotation in the same direction as the clutch advances, and thereby repelling the clutch so as to make it impossible for it to interlock with the wheels and cause a smash or interference in any part of the gear. What would occur under a direct drive would also obtain when the shaft S, was unclutched from the pinion D³, for if through the momentum of the car reacting upon the shaft S, its wheels revolved the wheels on the countershaft faster than their clutch C⁷, then no lurch or clash could occur any more than it could under a direct drive. Again, with the clutch set neutral as shown in Fig. 1, and with the shaft S, and all of the wheels revolving rapidly either owing to a direct drive or the momentum of the car, then if the clutch C⁷, was untimely thrown in contact with either of its wheels, it would be instantly repelled by them without interfering with their motion, until they slowed down, so that the clutch could catch up and engage with them and continue such motion without causing a clash or lurch. The foregoing also obtains when an untimely change is made from the middle to the slowest gear; in which case the clutch C⁷, could not take hold or interfere until the car slowed down to accord with the speed at which the engine might be rotating its slowest gear. The jolts caused by starting a car, or by suddenly increasing its speed by gear changes, are easily avoided by the well known means of controlling the clutch D, D', of the driving member, and as all clashing and blocking of gears are automatically prevented by my invention, it is plain that most of the cares and dangers connected with automobiles will be done away with through the advantages gained through it; which invention in this case is shown adapted for a gear having three speeds forward, and one backward, but it is obviously capable of many modifications, both relating to the number of gear speeds, as well as to the relative arrangement of its essential parts, without departing from its spirit or scope.

What I claim as my invention and desire to secure by Letters Patent is:

1. A change speed gearing comprising a driving member, a driven member, a countershaft, means for transmitting rotation from the driving member to the countershaft, means for locking the driving with the driven member for corresponding rotation; two toothed wheels rigidly joined and slidably but non-rotatively mounted on the driven member; two corresponding coacting wheels mounted rotatively but non-slidably on the countershaft and made wide enough to remain in mesh irrespective of any position to which the wheels on the driven member could be shifted; a slidable non-rotatable clutch mounted on the countershaft adapted for engaging with either of the wheels thereon; and means for sliding said connected wheels on the driven member and said clutch on the countershaft.

2. A change speed gearing comprising a driving member, a driven member, a countershaft; means for transmitting rotation from the driving member to the counter-shaft and also to the driven member; wheels on both the driven member and countershaft made broad enough to permanently intermesh irrespective of their position on their respective shaft or member; a ratcheted clutch upon the countershaft made to drive the wheels thereon in one direction, and means for sliding the clutch on the countershaft, and the wheels on the driven member.

3. A change speed gearing comprising a driving member, a driven member, a countershaft; means for transmitting rotation from the driving member to the countershaft, and for locking the driving with the driven member; two joined toothed wheels mounted on the driven member to slide but not rotate thereon, two other wheels made to permanently intermesh therewith mounted on the countershaft to rotate but not slide thereon, all of said wheels being broad enough to remain in mesh irrespective of their position; a clutch on the countershaft made to slide but not to rotate thereon and adapted for rotating said wheels therewith while allowing them to slip said clutch and rotate faster than the countershaft.

4. A change speed gearing comprising a driving member, a driven member, a countershaft; means for transmitting rotation from the driving member to the countershaft and also to the driven member; sliding non-rotatable wheels joined together on the driven member; non-sliding loose wheels on the countershaft made to constantly intermesh with said wheels on the driven member with a slidable clutch on the countershaft for rotating either of the wheels thereon; in combination with a fixed wheel on the countershaft and an off-set backing wheel, with means for sliding the wheels on the driven member to cause one of them to intermesh with said off-set wheel while both of them remain in mesh with the non-slidable wheels on the countershaft.

5. A change speed gearing comprising a driving and a driven member, a countershaft driven by the driving member, and an off-set backing wheel driven by the countershaft; wheels on both the driven member and the countershaft made broad enough on their faces to constantly intermesh irrespective of any position they could be placed at on their respective shaft or member; means for intermeshing one of the wheels on the driven member with said off-set backing wheel, or for locking the driven to the driving member by a single shifting action, and means for causing the countershaft to rotate either of the wheels thereon by a single shifting action while allowing said wheels to race ahead of the countershaft irrespective of their engagement therewith.

6. A change speed gearing comprising a driving and a driven member with means for interlocking them for corresponding rotation; a countershaft rotated by the driving member; two wheels joined together and slidably but not rotatably mounted on the driven member; two wheels mounted loosely but not slidable on the countershaft, all faces of said wheels being broad enough to remain in constant mesh irrespective of any position at which they could be placed on their respective shaft or member, and a slidable non-rotatable ratcheting clutch placed between the wheels on the countershaft adapted for driving them with the shaft, but not preventing them from racing ahead of it.

7. In a change speed gearing the combination of a driving and a driven member, a countershaft, means to drive the countershaft and the driven member by the driving member; two toothed wheels rigidly connected and mounted slidably but non-rotatively on the driven member; two corresponding wheels of different diameters mounted rotatably but non-slidably on the countershaft and made to continually intermesh with the first named wheels; and a sliding clutch made to engage the countershaft with either of the wheels thereon and impart rotation at different speeds to the wheels on the driven member without moving them upon their said member.

8. A change speed gearing comprising a driving and a driven member with means for interlocking them for corresponding rotation; a countershaft rotated by the driving member; two wheels joined together and slidably but not rotatably mounted on the driven member; two wheels mounted loosely but not slidably on the countershaft, all faces of said wheels being broad enough to remain in constant mesh, irrespective of any position at which they could be placed on their respective member, and a one-way toothed clutch on the countershaft adapted to be thrown into driving contact with the wheels on the countershaft, while at the same time permitting said wheels to overrun on their shaft.

ADDISON G. WATERHOUSE.

Witnesses:
WILLIAM N. COLE,
THOMAS L. DENNIS, Jr.